United States Patent [19]
Lafitte et al.

[11] 3,944,004
[45] Mar. 16, 1976

[54] BATCH WEIGHING SYSTEM

[76] Inventors: C. Wayne Lafitte; Thomas L. Thompson, both of P.O. Box 45873, Houston, Tex. 77045

[22] Filed: July 1, 1974

[21] Appl. No.: 484,584

[52] U.S. Cl. ............................................. 177/121
[51] Int. Cl.² ...................................... G01G 13/04
[58] Field of Search ................ 177/1, 114, 116–123, 177/60

[56] References Cited
UNITED STATES PATENTS

| | | | |
|---|---|---|---|
| 3,276,525 | 10/1966 | Cass | 177/1 |
| 3,545,555 | 12/1970 | Cass | 177/210 |
| 3,576,224 | 4/1971 | Susor | 177/47 |
| 3,608,656 | 9/1971 | Pettis | 177/114 |
| 3,659,665 | 5/1972 | Godwin | 177/1 |
| 3,712,395 | 1/1973 | Streater | 177/1 |
| 3,802,522 | 2/1974 | Thompson et al. | 177/121 |
| 3,828,869 | 8/1974 | Sellers | 177/50 |
| 3,998,395 | 3/1970 | Henry | 177/121 |

*Primary Examiner*—George H. Miller, Jr.
*Assistant Examiner*—Vit W. Miska

[57] ABSTRACT

An improved two feeder tray bulk weighment control system of the vernier operating type is disclosed. During an initial portion of the operating cycle of the device and while the weighment from the previous cycle is being dumped, a first feeder tray is driven to deliver a preliminary bulk target of 80–98% of the desired final weighment into a second feeder tray. During the conveying portion of the operating cycle both trays are driven at a rate inversely proportional to the difference between the actual weighment and a target weighment signal in an underdamped manner. As the final weighment is approached, improved circuitry prevents scale overshoot due to the underdamped rate controllers from causing premature dumping. A servo loop is also provided to cause the feed controller in operation during the dumping portion of the operating cycle to deliver the 80–98% of desired final weighment based on its actual delivery on the previous cycle of operation.

12 Claims, 2 Drawing Figures

BATCH WEIGHING SYSTEM

BACKGROUND OF THE INVENTION

This invention is generally related to the field of repetitive batch weighing of products either as a step in their packaging for sale or use, or for use in mixing of products. More particularly, the invention relates to a batch weighing system and associated scales that provides improved accuracy and simultaneously increases the speed of the packaging or weighment of the product.

The packaging of foods and other household products has increased many orders of magnitude within the past few years both as to the number of applications and as to the quantity of packages produced in each application. With this increase in quantity the packaging machinery has grown steadily more sophisticated and faster but the pace of these improvements has often been slowed by the one common denominator of all various methods and apparatus employed, the need to accurately weigh the product being packaged.

There have been many improvements in weighing devices such as that disclosed in U.S. Pat. No. 3,802,522. The batch weighing system disclosed in the above-mentioned patent produces a very accurate and fast weightment by achieving a critical scale damping factor in the weighing system. While this has proven to be very successful, the systems of this type may generally be stated to have a flaw in that in order to achieve the critical scale damping factor the first excursion of the scale voltage which passes the target weightment voltage is used to trigger the cessation of the weighment process. Such a decision is an irreversible decision and, in the case of scale overshoot, can lead to under weighment.

Automatic scale systems as known in the prior art have utilized the vernier weighment principle. In a vernier system, material is delivered to a scale at an initial high volume feed rate with limited accuracy to a weightment somewhat less than the final weightment desired. Then a much slower, or dribbling, feed rate is used to bring the weight up to the final weightment required. However, as the final weight is approached the scale damping, due to the possibility of overshoot of the scale used for the weightment, becomes a crucial factor. In the previously mentioned patent, the weightment system triggered feed stop on its initial excursion past a target weightment voltage. The weightment was assumed to be complete at this point, and the dump cycle of the apparatus was initiated. This places a high accuracy requirement on the achievement of critical damping factor in the scale mechanical and electrical componentry. In the present invention, however, improved circuitry is included to ensure that in fact the weightment process is actually complete and that a scale overshoot is not causing premature initiation of the dumping cycle to take place. Thus, critical damping in the mechanical and electrical components, while still highly desirable, is not crucial.

Additionally, in the present invention a novel and more accurate means for delivering the preliminary bulk targeting weight of feed material to the vernier feeding plan is achieved by the use of a bulking servo system. In this system, comparisons of the actual bulk delivery and a bluk target weight are made and the system delivering the bulk quantity is adjusted in its feed rate to more closely approximate the desired bulking characteristic. This leads to more rapid filling of the weightment scale.

Accordingly, it is an object of the present invention to provide a more accurate and faster bulk weightment system than has heretofore been available.

Another object of the present invention is to provide a vernier type bulk weightment system in which achieving a critical damping factor of the scale weightment apparatus does not constitute a crucial factor in the system.

Yet another object of the present invention is to provide a bulk weightment system of the vernier type wherein a bulk quantity of product delivered in the initial portion of the operation cycle of the apparatus is controlled in response to the performance of the prior attempts of the apparatus to deliver a correct target bulk amount.

BRIEF DESCRIPTION OF THE INVENTION

The above and other objects, features and advantages are provided in a bulk product weightment system of the present invention. In the system of the present invention a dual feeder tray arrangement is employed wherein product to be weighed is delivered first into a rear vibratory feeder tray from a product feeder hopper. The rate of the rear feeder is controlled in one portion of the operating cycle by a bulk rate adjust and gating circuit and in a second portion of the operating cycle by a feeding rate adjust and gating circuit. A weightment scale and dump mechanism, fed from the front vibratory feeder, provides instantaneous weight voltages which are proportional to the amount of product present in a weigh and dump bucket at any time during the cycle of operation of the apparatus. During the vernier portion of the weightment, the operation of the apparatus and the feed rate of both the rear feeder and front feeder are controlled in response to the weight of product present in the dumping bucket. When the proper amount of product is delivered to the dump bucket, a dumping cycle is initiated and the front feeder is turned off. However, during the dumping cycle a bulk servo weightment system driving the rear feeder is employed to deliver product from the product feeder hopper into the front feeder with the object of attaining a bulk target weight (approximately 80–98% of the final weightment desired) present in the front feeder before the initiation of a new vernier feeder cycle. The bulking servo system employed in the present invention causes the feed rate of product from the hopper into the front feeder during the dump cycle to be varied to deliver, in response to the bulk amount delivered, the appropriate amount. Additionally, during the feeder portion of the operating cycle, improved circuitry which avoids critical scale damping as a crucial factor is employed to prevent premature determination that the appropriate weightment is reached caused by scale overshoot.

Other objects, features and advantages of the invention will be apparent from the following detailed description thereof. The novel aspects of the present invention are pointed out with particularity in the appended claims. However, the invention is best understood by reference to the following detailed description thereof and the accompanying drawings, in which:

DESCRIPTION OF THE PREFERRED EMBODIMENT

Figure 1:
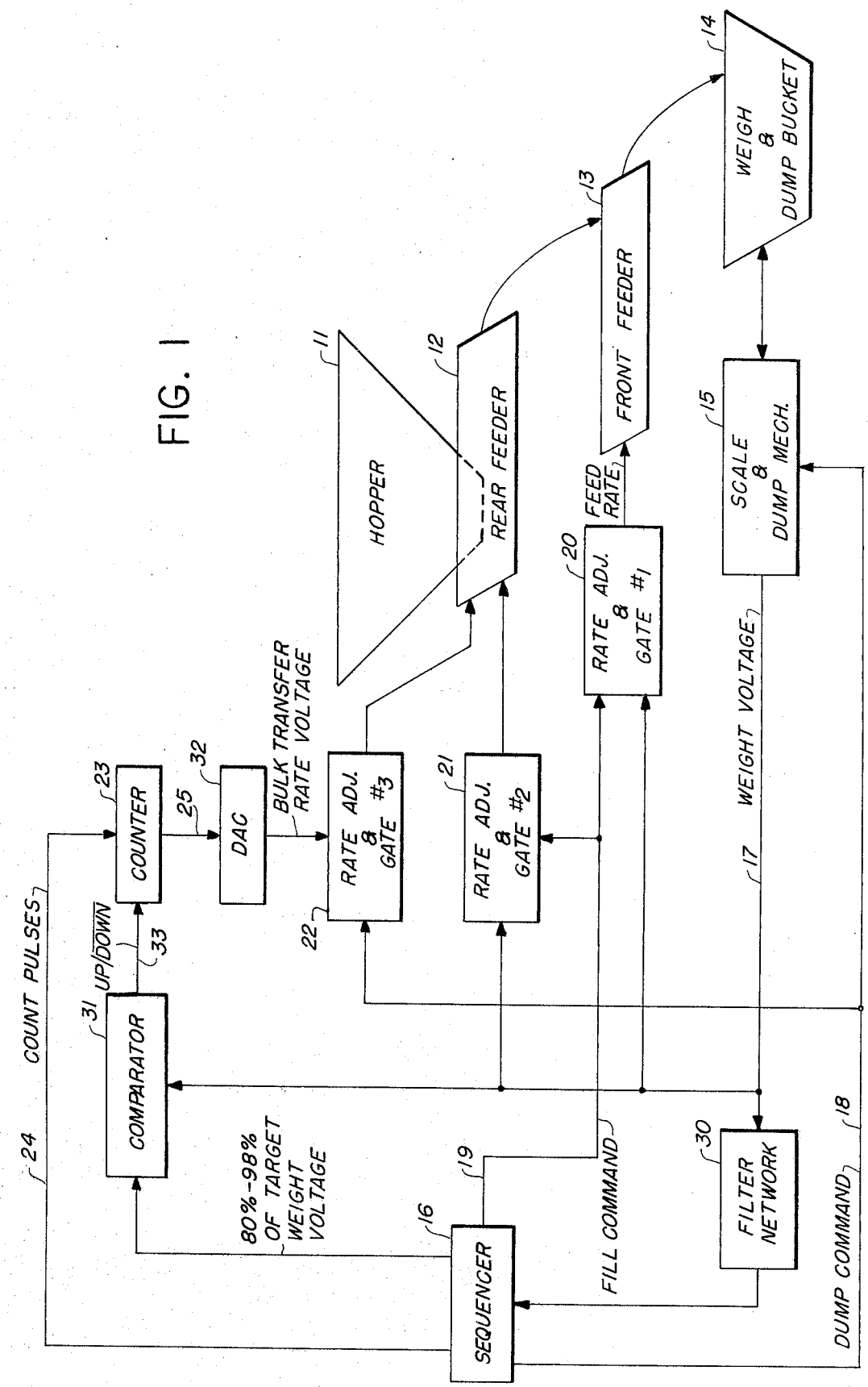
FIG. 1 is an overall block diagram illustrating a bulk weightment system in accordance with the concepts of the present invention.

Referring initially to FIG. 1, a bulk weighment control system in accordance with the concepts of the present invention is illustrated schematically. Generally, product to be weighed and packaged is placed in a feed hopper 11 under gravity flow into a vibratory motor driven rear feeder tray 12. When the rear feeder tray 12 vibrates under the control of the system the product is delivered therefrom into the front feeder tray 13 which is also of the vibratory motor driven type. As the front feeder tray 13 vibrates under the system control the product is delivered into a weigh and dump bucket 14. Bucket 14 may comprise a trap door bucket which, when the proper amount of product has been delivered, may be tripped to deliver the product into a package placed thereunder.

A novel scale and dump mechanism and circuitry 15 which is described and claimed in the previously mentioned U.S. Pat. No. 3,802,522 measures the amount of product present at any instant in time in the dump bucket 14. An output voltage signal is provided from the scale and dump mechanism 15 on line 17. This signal is labeled weight voltage in FIG. 1 and is supplied as an input to several other system components.

A weighment cycle in the present invention commences with a dump command signal provided as output from a sequencer 16 on a line 18 to the scale and dump mechanism 15. This dump command signal comprises a beginning of an operating cycle whether the weigh and dump bucket 14 has previously been filled or not. After the bucket 14 is dumped a fill command signal is generated by the sequencer 16 and is provided as an output therefrom on line 19. The weight voltage supplied on line 17 via a filter network 30 is applied as an input to the sequencer 16 and enables it to determine when the proper amount of product is in the bucket so that the fill command on line 19 may be removed ending the cycle. The next operational cycle begins as described with another dump command.

The front feeder tray 13 speed is controlled by a first rate adjust and gate circuit 20 which converts the weight voltage output from the scale and dump mechanism on line 17 into a feeder drive rate which is applied to the front feeder only when a fill command is present on line 19 from the sequencer 16. A second similar rate adjust and gate circuit 21 of FIG. 1 performs the same function for the rear feeder 12 during the existence of a fill command signal on line 19. Thus when the fill command signal is present on line 19 both the front feeder 13 and the rear feeder 12 are driven at a rate which is a function of the instantaneous product weight contained in the weigh and dump bucket 14 as determined by the scale and dump mechanism 15. This function is actually the inverse of the weighment signal provided by the scale and dump mechanism 15 in that when the weight in the dump bucket 14 is low, the feeder drive rates are high and as the weight of product in the weigh and dump bucket 14 approaches a target value the feed rate on both the rear and front feeders 13 and 12 slows down until it reaches zero when the target weight is contained in the weigh and dump bucket 14.

A third rate adjust and gate circuit 22 is enabled for operation only during the period that a dump command signal is present on line 18 from sequencer 16. It will be recalled that at the beginning of an operating cycle, a dump command signal is applied on line 18 to dump the contents of the weigh and dump bucket 14. This same signal is applied to rate adjust and gate circuit 22 and permits an arbitrary rate to be applied to the rear feeder tray 12 while the weighment bucket 14 is being dumped. The product thus dispensed from the hopper 11 piles up in the front area of the front feeder pan 13 but is not dispensed at this time into the weighment bucket 14 as the front feeder tray 13 is not vibrating or oscillating during the dump portion of the cycle. When the next filling portion of the cycle is commenced and the front feeder tray 13 starts its vibratory motion, this bulk of product which has built up therein during the dump portion of the cycle is immediately and practically simultaneously deposited in the weigh and dump bucket 14. When the fill command signal is then present on line 19 an initial large amount of product is delivered into the weigh and dump bucket 14 thus speeding up the weighment operation considerably. The simultaneous vibratory motion of front and rear feeders 13 and 12 under control of rate adjust and gate circuits 21 and 20 thus serves as a vernier control on the final amount of product delivered to weigh and dump bucket 14 after a large initial bulk amount is delivered at the very first portion of the filling portion of the cycle when a fill command is present on line 19.

At some adjustable and arbitrary time during the fill portion of the operating cycle (usually 1 and ½ to 2 seconds after the beginning of the fill command signal's presence on line 19) count pulse signals are supplied by the sequencer 16 to an up/down counter 23 via line 24. During this count signal the counter 23 value is either increased or decreased depending on whether the weight in the bucket 14 is either more or less than some bulk target percentage (such as 80%) of the desired target weight. Thus at some arbitrarily set time during the conveying mode the instantaneous weight in the bucket 14 is compared in comparator circuit 31 to a signal supplied by sequencer 16 which represents 80% of the required target. If the weight in bucket 14 is less than 80% the comparator 31 provides an up count output signal on line 33 and the counter 23 value is increased. If more than 80% of the bulk target is present in bucket 14 then comparator 31 provides a down count output on line 33 and the counter 23 value is decreased. The counter 23 output signal on line 25 (labelled bulk transfer rate voltage) is supplied to a digital to analog converter 32. Output voltage from DAC 32 is used to control the feed rate of the rear feeder 12 via rate adjust and gating circuit 22 during the next dump command signal on line 18 portion of the operating cycle as previously described.

After several cycles of operation the rear feeder tray 12 will be driven at a rate which will dispense almost precisely the right amount of product during the dump command signal so that whenever the arbitrary time into the conveying portion of the cycle has occurred, the weight in the dump bucket will have reached 80% of the target value.

As illustrated in FIG. 1 the instantaneous weight voltages are applied via line 17 to control the feed rate during the conveying portion of the cycle via the rate adjust and gate circuits 20 and 21. Thus as the instantaneous weighment in the weigh and dump bucket nears the target value the feeder 12 and 13 rates are proportionally reduced until they reach zero at the time that the instantaneous weighment in the weigh and dump bucket 14 reaches the target value. However, in order to prevent any scale 15 overshoot during the initial high bulk rate delivery portion of the cycle from causing a premature cessation of the conveyance portion, the sequencer 16 is provided with the weight voltage via additional filtering circuitry 30. The underdamped instantaneous weight voltage signal which may contain high frequency components supplied to sequencer 16 via line 17 is further filtered and damped by filter network 30 to prevent such a scale overshoot from causing a premature fill command voltage or dump command voltage being generated. It is thus possible that rate adjust and gate circuits 20 and 21 may cause feeders 12 and 13 to stop on a scale overshoot, but with the damping action of filter network 30 preventing such a transient overshoot from causing sequencer 16 to issue a dump command, the feeders 12 and 13 would be restarted by rate adjust and gate circuits 20 and 21 when the overshoot condition has ceased.

The foregoing has been a general description of the overall operation of the preferred embodiment of the present invention. The circuitry components of the system used to accomplish these functions will now be described in more detail.

RATE ADJUST AND GATING CIRCUITS

Figure 2:
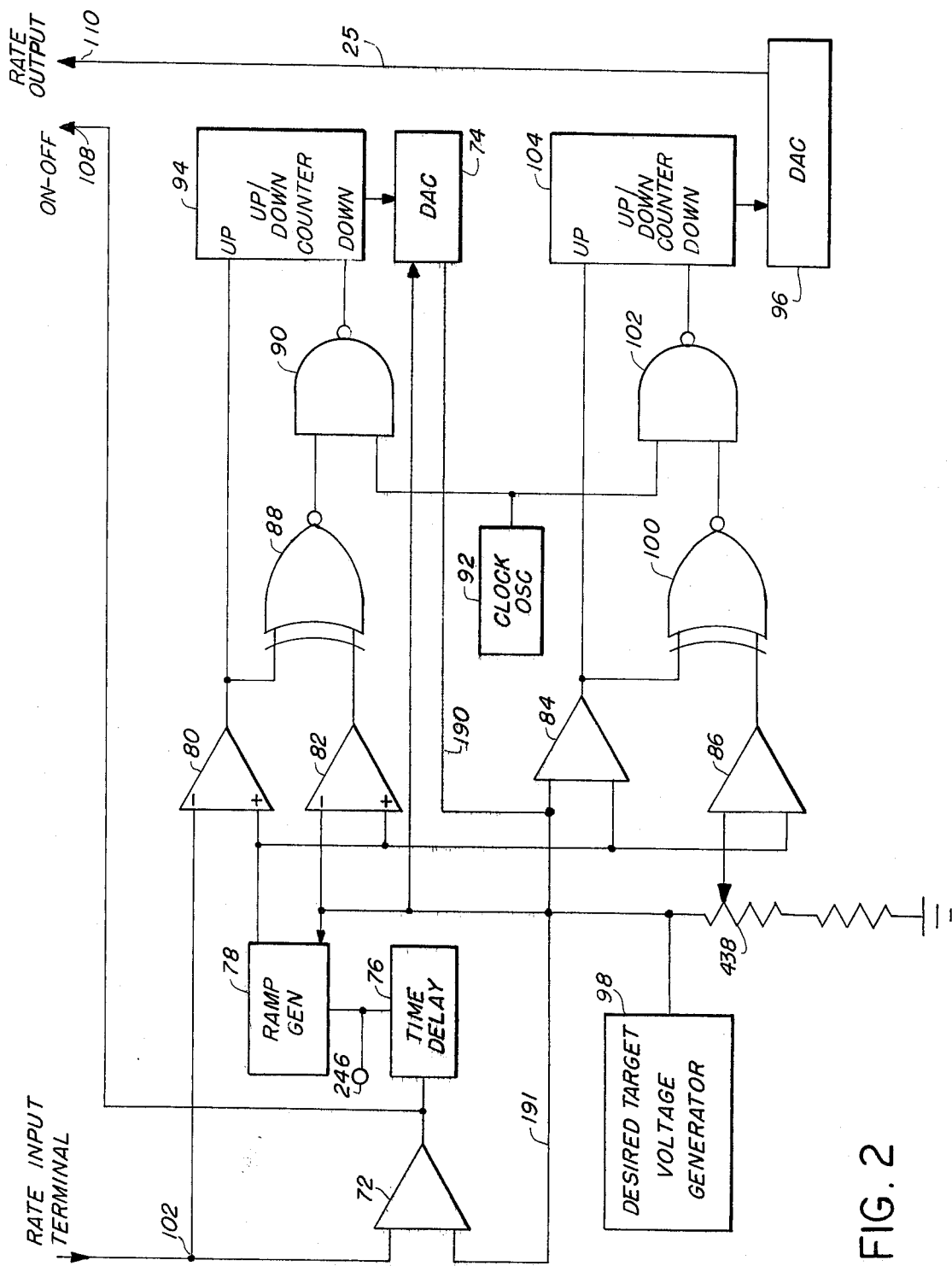
FIG. 2 is a circuit diagram illustrating a typical rate adjust and gating circuit as used in the system of FIG. 1.

FIG. 2 illustrates a typical rate adjust and gating circuit of the type used in rate adjust and gating circuits 20, 21, and 22 of FIG. 1. Generally, these circuits must be provided with two inputs, an enabling signal and a rate control signal. These circuits are supplied with an input rate control signal which is proportional either to the amount of product present in the weigh and dump bucket 14 (in the case of circuits 20 and 21 of FIG. 1), or with a bulk transfer rate voltage in the case of circuit 22. The rate adjust and gating circuits 20, 21 and 22 function to produce an output feed rate voltage control signal on output terminal 110 and on an on/off signal on terminal 108 which are used to drive the front feeder 13 and rear feeder 12 by controlling the current to the motor coils driving these feeders.

Referring now to FIG. 2, assume that the circuit shown here is controlling the feed rate of either front feeder 13 or rear feeder 12 and assume that the appropriate one of these feeders is operating and that product whose weight is to be measured is falling into weigh and dump bucket 14. Also assume that the scale and dump mechanism 15 is providing a weight voltage output which is used as an input to the circuit of FIG. 2 at terminal 102. As the weight in the weigh and dump bucket 14 increases, a rising voltage is produced on input terminal 102. When that voltage is equal to the output of a digital to analog converter 74, the output of amplifier comparator 72 turns off the feeder (12 or 13) and initiates a time delay of fixed duration controlled by time delay circuit 76. This time delay is chosen emperically but is usually maintained as short as possible while allowing for any material flowing after the feeder 12 or 13 cutoff to reach the weigh and dump bucket 14 with some additional time allowed to permit the scale circuit 15 to settle to a static value. At the end of this time delay period a ramp generator 78 is energized. The output of generator 78 is a positive going ramp voltage which is applied to one input of differential amplifiers 80, 82, 84 and 86.

Amplifiers 80 and 82 drive an exclusive OR circuit 88 whose output is supplied via a NAND gate 90 to gate pulses from a clock oscillator 92 to an up/down counter 94. The weight voltage on terminal 102 is also applied to amplifier 80 and the signal corresponding to the target weight (from a target voltage generator 98) is applied to amplifier 82. If these two signals are not equal the exclusive OR circuit 88 will generate an output signal during the time interval that the ramp generator 78 output voltage is between these two voltages. However, if the input weight voltage on terminal 102 is smaller than the commanded weight, the amplifier 80 will have an output signal before the amplifier 82 does and will cause the up/down counter 94 to count up. If the scale output voltage (at terminal 102) is greater than the commanded weight (from target voltage generator 98) the up/down counter 94 will count down, while clock pulses from clock oscillator 92 are applied through NAND gate 90. The resulting change in the output of digital to analog converter 74 is applied to differential amplifier 72 via lines 190 and 191 to alter the feeder cutoff point for the next weighment.

The rate at which product is fed by the feeders 12 and 13 is controlled by the output of a digital to analog converter 96. The voltage output of ramp generator 78 is applied to differential amplifiers 84 and 86 via line 192. The ramp voltage is compared with the output of DAC converter 74 in amplifier 86 via line 190 and potentiometer 438. The target voltage generator 98 provides an input to the rate adjust and gating circuit to be adjusted, as for example by an internal potentiometer. This voltage is used in conjunction with another potentiometer 438 used as a voltage divider to provide a ramp speed, and a feed rate setting voltage. As may be seen from FIG. 2, the feed rate is thus a function of the desired target voltage generator 98 output and may be adjusted independently thereof by use of potentiometer 438.

Amplifiers 84 and 86 control up/down counter 104. If the output of DAC converter 74 is not equal to the speed set voltage generated by potentiometer 438, DAC converter 96 will compensate by adjusting the speed of the feeding device (12 or 13). Thus the feeder rate is controlled by monitoring the amount of over or under feed being experienced. Actual speed adjustment of the feeder is adjusted so that the loop gain of this system is less than the gain of the weight control servo loop. This assures a slower response in the speed control loop and avoids oscillations.

The speed control circuitry functions as follows. Amplifiers 84 and 86 drive an exclusive OR 100. The output of exclusive OR 100 is applied to NAND gate 102 which in turn is used to gate pulses from clock oscillator 92 to up/down counter 104. Whenever the output of DAC converter 74 is not equal to the speed control signal provided by speed set potentiometer 438 and desired target voltage generator 98, exclusive OR 100 will generate an output signal during the time interval the output of ramp generator 78 is betwen those 2 voltages. If the output of DAC converter 74 is smaller than the speed control signal, amplifier 84 will have an output signal prior to any output signal from amplifier 86. This will cause the up/down counter 104 to count up (and, of course, down if the converter 74 signal is greater than the speed control signal). The number of up or down pulses is determined by the period of clock oscillator 92 and the time interval during which its output pulses are applied to the up/down counter 104 through NAND gate 101. The resulting change in the output of converter 96 is applied on a rate output control terminal 110 for use in controlling the current supplied to the motor coil of the appropriate front or rear feeder 12 or 13. The clock frequency generated by oscillator 92 is selected arbitrarily because the feed rate (and weight cutoff) is to approach its desired level in an underdamped manner. Thus the feed cutoff can respond to short term variations in product characteristics or flow rates without generating significant offsets from the desired feed rate levels.

It should be noted that rate adjust and gate circuit 22 of FIG. 1 functions as just described with respect to FIG. 2 circuitry but only contains the rate control portion of the circuit of FIG. 2 (i.e. circuitry corresponding to up/down counter 104, NAND 101, amplifiers 84 and 86 and exclusive OR 100 and their associated components). The bulk transfer rate voltage supplied from DAC 32 of FIG. 1 is analogous to the output of DAC 74 of FIG. 2 in this instance.

The above description may make other alternative arrangements apparent to those skilled in the art. It is, therefore, the aim of the appended claims to cover all such changes and modifications as fall within the true spirit and scope of the invention.

What is claimed is:

1. In apparatus for the repetitive weighing of a preselected weight in a weigh and dump cycle having a weigh portion and a dump portion wherein bulk product is transported to a scale hopper by means of a two vibratory feeder tray apparatus arranged where the output of a first feeder tray is delivered into a second feeder tray and from said second feeder tray into said hopper and where said scale hopper delivers an output signal representative of the weight of product contained therein at any time, the improvement comprising:

means responsive to the value of said representative output signal at a selected arbitrary time in the weigh portion of a previous weigh and dump cycle for controlling the vibratory rate of said first feeder tray during dump portion of a weigh and dump cycle to deliver a preselected target amount of said product into said second feeder tray during the dump portion of said weigh and dump cycle.

2. The system of claim 1 wherein said means for controlling the vibratory rate of said first feeder tray during the dump portion of a weigh and dump cycle controls said vibratory rate in response to the difference between the value of said representative output signal at a time approximately 1.5 seconds from the beginning of the weigh portion of the previous cycle and a signal representative of approximately 80% of said preselected weight.

3. Apparatus for repetitively weighing and dumping preselected weight of a bulk granular product in a weigh and dump cycle having a weigh portion and a dump portion comprising:

first product feeder tray means of the vibratory type for delivering an output of product at a rate proportional to its speed of vibration;

means for delivering product under gravity flow into said first feeder tray;

second product feeder tray means of the vibratory type arranged to receive the output of said first feeder for delivering an output of product at a rate proportional to its speed of vibration;

weigh and dump bucket and scale means, arranged to receive the output of said second feeder tray means, for weighing the product so received and for generating an underdamped output signal representative thereof;

means for, during said weigh portion of said weigh and dump cycle, controlling the vibratory rates of said first and second feeder means in an underdamped manner in response to the difference between said output signal and a preselected target weighment signal;

means for, during said dump portion of said weigh and dump cycle, controlling the vibratory rate of said first feeder means only, in response to a bulk weighment representative output signal derived at an arbitrary time in the previous weigh cycle and functionally representative of a bulk weighment delivered from said first feeder means to said second feeder means during the previous dump portion of said weigh and dump cycle; and control means responsive to said output signal for detecting when a predetermined amount of produce is delivered from said second feeder means to said weigh and dump bucket means and for initiating said dump portion of said weigh and dump cycle upon such occurrence.

4. The system of claim 3 and further including means for smoothing said underdamped output signal from said weigh and dump bucket and scale means prior to its input to said control means to prevent initial transient overshoot conditions present in said underdamped output signal from causing said control means to initiate said dump portion of said weigh and dump cycle prematurely before said predetermined amount of product is delivered from said second feeder means to said weigh and dump bucket and scale means.

5. The system of claim 3 wherein said means for controlling the vibratory rate of said first feeder means only during the dump portion of said weigh and dump cycle includes means for comparing said representative bulk weighment signal derived from said previous weigh portion of said weigh and dump cycle with a bulk weighment target signal and means for generating an output control signal proportional to the difference thereof.

6. The system of claim 4 wherein said smoothing means comprises low pass filtering means for removing any high frequency transients present in said underdamped output signal.

7. The system of claim 5 wherein said bulk weighment target signal comprises a signal representative of a bulk target weighment of approximately 80 to 98% of said weighment target signal.

8. Apparatus for repetitively weighing and dumping a preselected weight of a bulk granular product in a weigh and dump cycle having a weigh portion and a dum portion, comprising:

feeder hopper means for delivering under gravity flow an output of product;

rear vibratory type feeder tray means arranged to receive the output of said feeder hopper means for delivering an output of product at a rate proportional to its speed of vibration;

front vibratory type feeder tray means arranged to receive the output of said front feeder tray means for holding a bulk weighment of said product and adapted to dump said weighment upon command;

scale means connected to said weigh and dump bucket means for weighing the quantity of product in said weigh and dump bucket means at any time and for generating an underdamped weight voltage signal representative thereof;

control means responsive to said weight voltage signal for detecting when a predetermined amount of product is contained in said weigh and dump bucket means and for initiating said dump portion of said weigh and dump cycle upon the occurrence of a predetermined weight of product in said weigh and dump bucket;

first speed control means for controlling, in response to said weight voltage signal, the vibratory speed of said rear feeder tray during the weigh portion of said weigh and dump cycle;

second speed control means for controlling, in response to said weight voltage signal, the vibratory speed of said front feeder tray during the weigh portion of said weigh and dump cycle; and third speed control means for controlling, in response to a weight voltage signal occurring at an arbitrary time during the weigh portion of a previous weigh and dump cycle and functionally representative of a bulk product weighment delivered from said rear feeder tray to said front feeder tray during the dump portion of a previous weigh and dump cycle, controlling the vibratory speed of said rear feeder tray to deliver, during said dump portion of a weigh and dump cycle, an amount of bulk product to said front feeder tray which is functionally related to said preselected weight of said product.

9. The system of claim 8 and further including means for smoothing said underdamped weight voltage signal prior to its input to said control means to prevent initial transient overshoot conditions present in said underdamped signal from causing said control means to prematurely initiate said dump portion of said weigh and dump cycle.

10. The system of claim 9 wherein said smoothing means comprises low pass filtering means for effectively blocking any high frequency transient voltage signals present in said underdamped signal from reaching said control means.

11. The system of claim 9 wherein said third speed control means comprises means for comparing said weight voltage signal occurring at an arbitrary time in a previous weigh portion of a weigh and dump cycle with a target bulk weight voltage signal functionally related to said preselected product weighment sought to be achieved.

12. The system of claim 11 wherein said arbitrary time is chosen to be approximately 1.5 seconds from the beginning of the weigh portion of the previous weigh and dump cycle and said target bulk weight is chosen to be approximately 80–98% of said predetermined product weighment.

* * * * *

UNITED STATES PATENT AND TRADEMARK OFFICE
CERTIFICATE OF CORRECTION

PATENT NO. : 3,944,004
DATED : March 16, 1976
INVENTOR(S) : LAFITTE et al

It is certified that error appears in the above-identified patent and that said Letters Patent are hereby corrected as shown below:

Column 1, line 66, after "a", delete the word "bluk" and insert therefore --bulk--.

Column 6, line 52, delete the number 102 and insert therefor --101--.

Column 8, line 55, delete the word "dum" and insert therefor --dump--.

In the drawing, Fig. 2, reference numeral "102" labelling the NAND gate should be changed to -- 101 --.

Signed and Sealed this

Eleventh Day of October 1977

[SEAL]

Attest:

RUTH C. MASON
Attesting Officer

LUTRELLE F. PARKER
Acting Commissioner of Patents and Trademarks